G. MEES.
VALVE MOTION FOR GAS MOTORS.
APPLICATION FILED OCT. 21, 1903.
921,864.
Patented May 18, 1909.
2 SHEETS—SHEET 2.
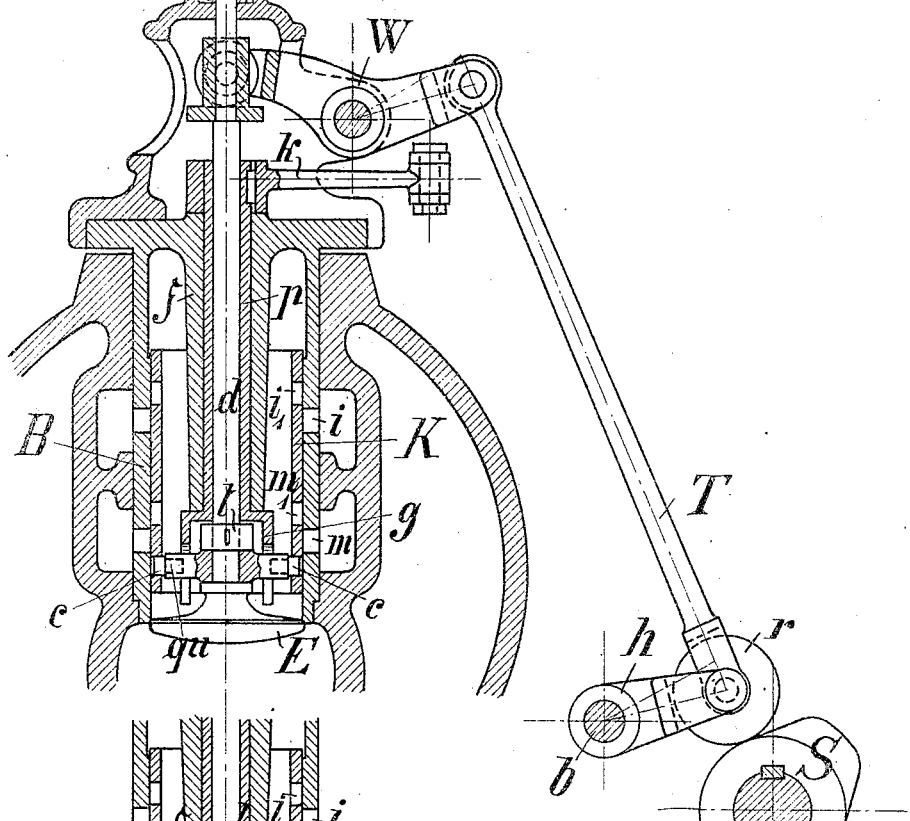

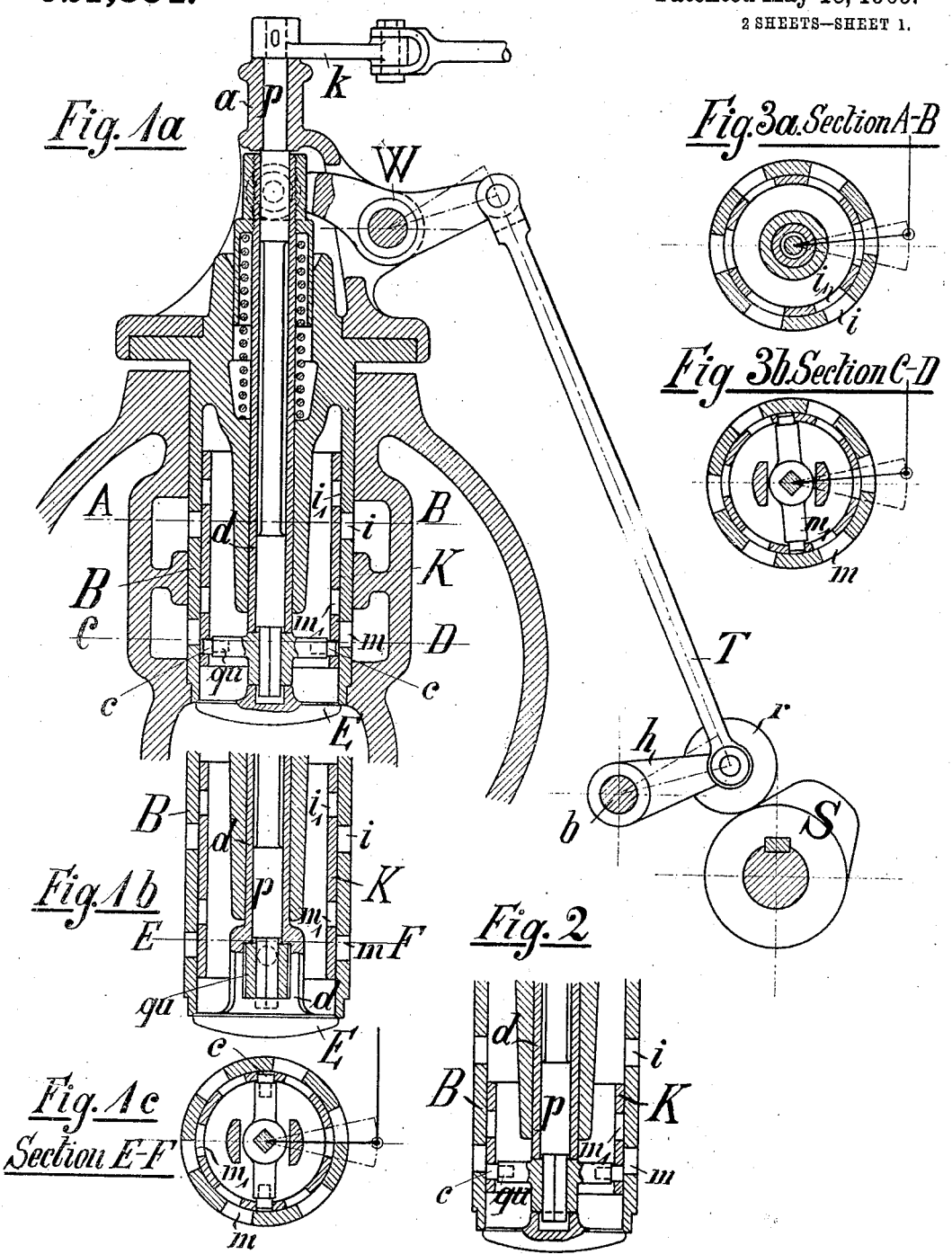

UNITED STATES PATENT OFFICE.

GUSTAV MEES, OF DUSSELDORF, GERMANY.

VALVE-MOTION FOR GAS-MOTORS.

No. 921,864.  Specification of Letters Patent.  Patented May 18, 1909.

Application filed October 21, 1903. Serial No. 177,973.

*To all whom it may concern:*

Be it known that I, GUSTAV MEES, a subject of the Emperor of Germany, residing at Schadowstrasse, 21, Dusseldorf, Germany, have invented certain new and useful Improvements in Valve-Motions for Gas-Motors; and I do hereby declare the following to be a full, clear, and exact description of the invention, such as will enable others skilled in the art to which it appertains to make and use the same.

In the ordinary motors, being regulated by the varying of the charges of the cylinder, the regulator acts upon the mechanically guided inlet valve either by means of an adjustable beveled cam or by means of an adjustable lever mechanism, or it influences a throttle arranged in the inlet channel for the gas mixture. In each of these cases and also in the case of the motors being regulated by varying the proportions of the mixture a closing organ for the gas (gas valve, mixing valve, etc.) being independent from the inlet valve, is indispensable. The same can be guided mechanically, or it can be made self acting. In the former case special means for guiding the same are necessary and thus the controlling mechanism is increased while a self acting gas or mixing valve has the disadvantage, that it gets easily out of order, by dirt accumulating therein which occurs especially often, when the gas is not thoroughly purified, as for instance when gas is employed from an aspiration generator.

The present invention has for its object to produce a valve motion, acting in an absolutely reliable and exact manner having the least possible mechanical means and avoiding lever mechanism and controlling disks to be moved by the governor.

It is a known fact that disks especially when employed for valves of the larger size show serious disadvantages and difficulties with respect to construction.

In the accompanying drawings forming part of the present specification, Figure 1$^a$ is a section through the head of a cylinder with the valve regulating the charge. Figs. 1$^b$ and 1$^c$ show details of the regulating device in section. Fig. 2 is a detailed sectional view showing the regulating organ for regulating the mixture or in other words regulation by varying the proportion of the mixture. Figs. 3$^a$ and 3$^b$ indicate in sections the regulating means for regulating the mixture and as well the charge combined. Figs. 4$^a$ and 4$^b$ are sections through a slightly modified form of the invention.

E in Fig. 1$^a$ is the inlet valve being moved by the cam disk S on the motor shaft by means of roller $r$ rod T and bell crank lever W. The arm $h$ pivoted on the bolt $b$ serves to guide the roller $r$ at the end of the rod T. Air ports $i$ and gas ports $m$ in the cylindrical valve body B are closed off by a piston slide K which is connected with the stem of the inlet valve by means of a cross bar $qu$ thus being compelled to follow the axial displacements of the valve. When the inlet valve is opened by means of the above described mechanism the piston slide K also opens the air and gas ports $i$ and $m$ by means of corresponding ports $i_1$ and $m_1$ in sliding down with the valve and in the same manner shuts off these ports immediately before the inlet valve closes. The piston slide thus serves not only as a shut off but serves also as regulation means and to this end it is connected with the inlet valve E in such a manner that it may be turned by the governor, thereby opening more or less the ports $i$ and $m$ by the corresponding ports $i_1$ and $m_1$ in its cylindrical body, as shown in Fig. 1$^c$ so that the aspirated air as well as the gas is throttled more or less according to the position of the governor and that a smaller or greater quantity of gas mixture is aspirated. To this end the hollow stem $d$ of the inlet valve incloses a spindle $p$ being guided at its upper end in a sleeve $a$ and secured in the hub of an arm $k$ which is connected in a suitable manner with the governor. The cross bar $qu$ above mentioned slides with a collar or sleeve on the square head of the spindle $p$ and the outer trunnions $c$ project into corresponding holes of the piston valve K. Whenever the governor turns the arm $k$ the spindle $p$ follows and turns by means of the square head the cross bar $qu$ and the piston valve K. According to the extent and direction of motion of the arm $k$ the cross sections of the ports $i$ and $m$ may be made larger or smaller corresponding to the charge put on the motor or corresponding to the quantity of gas being aspirated in accordance with the actual charge of the motor.

By the turning of the piston valve K the governor produces a throttling in the same measure for the air as well as for the gas, the proportion of the mixture remaining constant at all charges, while the charges and the compression vary. Thus in this instance the regulating is effected by regulating the charge. But the same means are adapted to regulate the working of the motor by varying the ratio of the mixture at a constant compression. In such case it is only necessary to throttle the supply of the gas through the ports $m$ and $m_1$ by the piston valve, while the air ports remain constantly and fully open. The valve K must therefore be made shorter as shown in Fig. 2. Finally the same means may be used to combine both ways of regulation by varying at constant compression the proportion of the mixture to a certain limit within the safety of ignition and by regulating from this limit in varying the quantity of gas mixture while the proportion of mixture remains constant or approximately constant. In this case the length of the air ports $i_1$ and of the gas ports $m_1$ in the valve K should be made different, preferably so that the throttling of the air commences only at a certain position of the valve while each position of the governor and of the piston valve produces a change of the throttling of the gas; the air ports $i$ remain fully open until the parts reach this certain position as it is indicated in the Figs. 3ª and 3ᵇ.

In the modification Figs. 4ª and 4ᵇ the valve stem $d$ is inclosed within a sleeve $p$ which is adapted to turn in a sleeve $f$ of the valve case; the arm $k$ which is connected with the governor is keyed upon the upper end of sleeve $p$ the lower end of which is fork-shaped as at $g$, and the prongs of said fork engage the cross bar $qu$ compelling the same to follow the revolution of sleeve $p$ while longitudinally the prongs of the fork admit of a free motion of the parts with respect to each other. The cross bar is secured to the stem of the valve by means of a ring $t$ and a wedge so that the piston valve K follows the motion of the inlet valve longitudinally while the governor turns the same more or less in the described manner. This modification offers the advantage that the inlet valve may be turned for fully 360° while in above described arrangement the turning would be limited to less than 180°.

Having thus described my invention what I claim as new and wish to secure by Letters Patent of the United States is:—

1. Valve motion for gas motors, composed of the inlet valve a spring and a cam for controlling the same in combination with a piston valve K having ports $i_1$ and $m_1$ in its cylindrical body adapted to cover the ports $i$ and $m$ communicating with the air and the gas supply respectively said piston valve being mounted on the stem of the inlet valve to follow the motion of the latter longitudinally and to turn with a spindle $p$ connected with the governor of the motor to be turned thereby, in order to displace the port openings upon each other by the longitudinal movement of the piston valve K and simultaneously close said port openings more or less by a part of a revolution, thereby regulating the working of the motor substantially as described.

2. Valve motion for gas motors composed of the inlet valve, a spring and a cam for controlling the same in combination with a piston valve K having ports $m_1$ in its cylindrical body adapted to cover the ports $m$ communicating with the gas supply, said piston valve being so mounted on the valve stem of the inlet valve to follow the motion of the latter longitudinally and to turn with a spindle $p$ connected with the governor of the motor to be turned thereby, in order to displace the port openings upon each other by the longitudinal movement of the piston valve K, and simultaneously close said port openings more or less by a part of a revolution thereby regulating the working of the motor.

3. Valve motion for gas motors composed of the inlet valve controlled by a spring and cam or an eccentric in the ordinary manner, in combination with a piston valve K having ports $i_1$ and $m_1$ in its cylindrical body adapted to cover the ports $i$ and $m$ communicating with the air and gas supply, said piston valve being connected with the valve stem by means of a cross bar $qu$ slidably secured on a square head at the lower end of a revoluble spindle $p$ in the hollow stem of the inlet valve, the upper end of said spindle carrying an arm $k$ controlled by the governor substantially as described.

4. Valve motion for gas motors composed of the inlet valve controlled by spring and cam or an eccentric in the ordinary manner, in combination with a piston valve K having ports $i_1$ and $m_1$ in its cylindrical body adapted to cover the ports $i$ and $m$ communicating with the air and gas supply respectively, said piston valve being rotatably secured on the valve stem $d$ of the inlet valve by means of a cross bar $qu$, said cross bar playing in a fork at the lower part of a revoluble sleeve surrounding the valve stem the upper end of said sleeve carrying an arm $k$ controlled by the governor substantially as described.

5. In a valve motion for gas motors an inlet-valve, a piston valve K controlled simultaneously with the said inlet valve by a cam making an invariable stroke and revoluble by the governor of the motor.

6. In a valve motion for gas motors an inlet-valve, a piston-valve K controlled simultaneously with the said inlet-valve by a cam and revoluble by the governor of the motor, said piston-valve having gas ports and air ports and adapted to throttle the air and gas supply for the cylinder simultaneously.

7. In a valve motion for gas motors, a piston-valve K moved simultaneously with the inlet-valve E and revoluble by the governor of the motor said piston-valve having gas-ports $m_1$ and air ports $i_1$, and being adapted to throttle the air and gas supply for the cylinder simultaneously and in equal parts.

8. In a valve motion for gas motors an inlet-valve, a piston valve K controlled simultaneously with the said inlet-valve by a cam making an invariable stroke and revoluble by the governor of the motor, said piston-valve having gas-ports and air ports and adapted to throttle the air and gas supply for the cylinder simultaneously, the said gas ports being constructed to be closed before the closing of said inlet valve, whereby the piston valve acts simultaneously as a regulating device and as a mechanically controlled closing means for the gas ports.

9. In a valve motion for gas motors an inlet valve E in combination with means for regulating its motion a governor and a piston valve K mounted on the stem of said inlet valve and provided with ports said piston valve being connected with a cross-bar compelling it to participate in the opening and closing movements of the valve E, and a shaft $p$ square at its lower end entering the hollow stem $d$ of the inlet valve and connected with a lever $k$ so that the piston valve may be revolved by the governor.

In testimony whereof I affix my signature.

GUSTAV MEES.

In the presence of—
 WILLIAM ESSENWEIN,
 OSKAR MARKISCH.

DISCLAIMER.

921,864.—*Gustav Mees*, Dusseldorf, Germany. VALVE-MOTION FOR GAS-MOTORS. Patent dated May 18, 1909. Disclaimer filed October 18, 1917, by the assignees, *Westinghouse Electric & Manufacturing Company* and *The Colonial Trust Company, trustee.*

Enters its disclaimer—

"To that part of the claim in said specification which is in the following words, to wit:

"5. In a valve motion for gas motors an inlet-valve, a piston valve K controlled simultaneously with the said inlet valve by a cam making an invariable stroke and revoluble by the governor of the motor."

[*Official Gazette November 6, 1917.*]